United States Patent [19]
Charette

[11] Patent Number: 6,105,940
[45] Date of Patent: Aug. 22, 2000

[54] ADAPTIVE PORTABLE LIFTING DEVICE

[76] Inventor: Roger P. Charette, 17 Summer St., Madawaska, Me. 04756

[21] Appl. No.: 08/821,386

[22] Filed: Mar. 20, 1997

[51] Int. Cl.[7] .................................................. B60S 9/02
[52] U.S. Cl. ............................................................ 254/423
[58] Field of Search .................................. 254/418–427, 254/93 H, 93 HP, 93 R, 134

[56] References Cited

U.S. PATENT DOCUMENTS

| | | | |
|---|---|---|---|
| 962,609 | 8/1910 | Carberry | 254/425 |
| 1,137,362 | 4/1915 | Spalding | 254/423 |
| 1,590,830 | 6/1926 | Jewkes | 254/93 HP |
| 1,930,802 | 10/1933 | Hamilton | 254/425 |
| 1,988,304 | 1/1935 | Duman | 254/425 |
| 2,490,668 | 12/1949 | Burgett | 254/418 |
| 2,519,364 | 8/1950 | Fredholm | 254/424 |
| 2,570,334 | 10/1951 | Erjavec | 254/418 |
| 3,567,183 | 3/1971 | Voss | 254/93 H |
| 3,614,064 | 10/1971 | Bennett | 254/418 |
| 3,667,730 | 6/1972 | Kollmar | 254/424 |
| 5,711,504 | 1/1998 | Cusimano | 254/424 |

*Primary Examiner*—Robert C. Watson
*Attorney, Agent, or Firm*—Thomas L. Bohan; Patricia M. Mathers

[57] ABSTRACT

An adaptive portable lifting and leveling apparatus that forms an emergency jacking system useful in lifting, leveling, or otherwise stabilizing a variety of vehicles such as trailer structures. The apparatus primarily includes a lifting device having an anchoring bracket that functions as a pivot point, a mid-section, and a jack base of a standard type each being removably connected together in series. A hydraulic jack is preferred. The mid-section may be of a fixed length or may be telescoping such that the device includes a two stage adjustment with course adjustment via the telescoping mid-section and fine adjustment via the hydraulic jack base. Multiple anchoring brackets may be placed upon a surface of a structure to be lifted. The device may be quickly and easily moved to any one of the multiple brackets as desired. The device may be stored in a tucked-away position under the structure to be lifted. Alternatively, the device may be detached and stored elsewhere. The device may be produced as an after-market kit for adaptive portable lifting and/or leveling of a structure. Also included is a method for adaptive portable lifting, leveling, or otherwise stabilizing a variety of vehicles such as trailer structures.

19 Claims, 4 Drawing Sheets

ADAPTIVE PORTABLE LIFTING DEVICE

BACKGROUND OF THE INVENTION

1. Field of Invention

The present invention relates to the field of lifting and leveling devices. More particularly, the present invention relates to a device for providing immediate and adjustable vertical support. More particular yet, the present invention involves an adaptive device for lifting and leveling structures such as trailers, where the device is pivotably mountable on the structure's underside and utilized manually with minimal effort.

2. Description of Prior Art

In the field of vertically adjustable support mechanisms for lifting and leveling, there are a variety of devices commonly referred to as jacks. Jacks are utilized in many different situations with any number of vehicles such as automobiles, trucks, buses, and recreational vehicles. More related to the instant invention, jacks are also used to lift, support, and level trailers. Such trailers may be open-bed or enclosed, may be a simple container-like structure, or may serve a specific function—e.g., car-carriers, horse-trailers, boat-trailers, camper-trailers including those known as "fifth wheels"—or the like. Jacks used for such trailers vary in both design and manner by which they operate. Such jacks may be electrically powered via a linear motor like a solenoid or via a rotary motor with gearing to transfer rotary motion to linear motion. Also, they may be hydraulically powered via a hydraulic cylinder unit. The hydraulic cylinder units may stand alone or be part of an elaborate hydraulic system linked to the vehicle towing the trailer or even to a trailer-based hydraulic system. Further, jacks may include mechanical gearing powered manually via the operator himself. Still further, jacks may include features of any combination of powering methods.

Common to all of the various types of prior jacks is some elongation of the jack body. Generally, one end of the jack will be fixed to the structure being lifted, supported, or leveled while the other end of the jack will be brought into contact with an immovable surface (i.e., a floor or earthen surface). Operation of the jack provides mechanical elongation of the jack body electrically, hydraulically, manually, or some combination thereof. This causes the structure such as a trailer to be displaced vertically, or otherwise supported vertically, in opposition to the immovable surface. If the immovable surface is not level, the vertical displacement may be termed as leveling such that the structure will become level when the jack is appropriately positioned. Several prior art systems for lifting and leveling exist which include these and other features and characteristics.

In the field of lifting and leveling, there have been attempts to provide stronger, more stable devices which elevate, support, or otherwise stabilize a movable structure. In general, the complexity of such efforts has undercut whatever advantages they might otherwise offer. Indeed, the time and effort involved in using complex and inefficient lifting and leveling devices is self-defeating. One related prior-art device is that of Sill et al. (U.S. Pat. No. 3,879,055), and involves stabilizing a camper-trailer. The device of Sill et al. is a set of telescoping supports that are pivotably mounted under a camper-trailer. Either support may fold up under the camper-trailer when not in use and are folded out and extended during use. As they are not designed to elevate the camper-trailer and are positioned at an angle to the ground, these supports are not able to provide any leveling features. Accordingly, the device of Sill et al. requires the camper-trailer to be placed on level ground and fails to provide any useful compensation for camper tilting.

There are, however, other prior-art devices similar to Sill et al. which do exhibit lifting and leveling capabilities. Such include the devices of Bruno et al. (U.S. Pat. No. 4,815,711), Valdespino (U.S. Pat. No. 4,216,939), and Hansen (U.S. Pat. No. 3,362,683). These three are devices that can stabilize a structure, such as a camper-trailer, with pivotable telescoping supports in a sufficiently powerful manner to provide compensation for any tilting of the structure. More particularly, the device of Bruno et al. is a hydraulic leveling device that has a hydraulic cylinder fixed in a vertical position via a clamp affixed to a surface of the structure to be leveled. The hydraulic cylinder has a pivot point at its telescoping end. Attached to the pivot point is a support foot that is able to pivot between an L-shaped position and an extended position that is parallel and aligned with the hydraulic cylinder. Such a design renders the device of Bruno et al. of limited use because the hydraulic cylinder is always in the vertical position. Even though the support foot is foldable, it is not fully retractable due to the location of the pivot point. Thus, when not in use the leveling device of Bruno et al. will tend to project away from the structure being leveled and pose a safety hazard or simply be more prone to damage.

The device of Valdespino is another leveling device which includes a set of hydraulic cylinders for leveling a camper-trailer. In this device, however, there is a support foot fixedly attached to the hydraulic cylinder's telescoping end. The other end of the hydraulic cylinder is pivotably attached to a bottom surface of the camper-trailer. When not in use, each support foot is linearly retracted by its respective hydraulic cylinder which is then pivoted together to a folded position against the camper-trailer. The device of Hansen is substantially similar to that of Valdespino except that the Hansen device provides that each hydraulic cylinder is foldable into a recessed encasement. A general defect of the devices of Valdespino, Hansen, and Bruno et al. is that none of these devices enable the cylinders to be readily moved around on the surface of the structure to be leveled. This lack of versatility is a by-product of the complex hydraulic systems that these three devices represent.

Concurrent with the development of the prior-art hydraulic lifting/leveling devices already mentioned, self-contained lifting devices have been developed with the goal of removability. Typically, such devices are bolted to a support-plate located somewhere along the periphery of the structure being lifted and/or leveled. This allows a linearly adjustable support to be mounted alongside the structure. Two representative prior-art devices are those of Bock (U.S. Pat. No. 4,784,369) and Mann (U.S. Pat. No. 3,709,467). The lifting device of Bock includes a base with telescoping tubes. The base is at one end removably bolted to a mounting bracket and at the other end fixed to a tripodal foot. A manually-operated crank raises and lowers the tripodal foot via the telescoping tubes. As the tripodal foot is extended against the ground surface, the structure to which the lifting device is bolted is raised. The device of Bock exhibits several flaws, including, most importantly, a lack of range in the telescoping distance. The mounting surface of the structure before being lifted can be no further off the ground than the non-extended length of the telescoping device. This aspect severely limits the mounting surface locations upon which the telescoping device may be placed.

The device of Mann includes an adjustable vertical support device similar to Bock but one having a removable hydraulic jack. Included in the Mann device are four vertical supports which are vertically adjustable by means of the hydraulic jack. As the hydraulic jack is removable, the jack may be used for raising and lowering each of the four vertical supports incrementally. Accordingly, the device of Mann is time-consuming in its operation. Further, while the jack is itself transferrable to each vertical support, the supports are not movable. Similar to Bock, the device of Mann is severely limited in its versatility because each of the four supports are fixed in their positions and cannot be readily moved so as to better adapt to uneven ground. Expense is added by having the supports each fixed to a corner. As well, safety is decreased because the supports are not secured to the structural frame.

In a related manner, those trailers having motorized mechanisms to lift or lower a trailer—particularly those trailers known as "fifth wheels," that is, those trailers having one or more jacks up front that are used to couple or uncouple the trailer from within or on a carrier vehicle, require a supplemental lifting means. In the event the gears from the motorized mechanism are stripped or otherwise rendered inoperable, the user cannot either move the fifth wheel into a coupling position with the vehicle, or he cannot uncouple it from the vehicle. In that regard, it would be useful to have a completely functional jack—or at least the capability to install a useable jack—at the front of such types of trailers as a backup for the costly and complex motorized mechanism.

Accordingly, the prior art fails to provide any vertically adjustable lifting device that is compact, portable, and readily adaptable to a wide range of lengths and lifting needs. Therefore, what is needed is a lifting device that provides a high degree of portability. What is also needed is such a device that is easily adaptable for use at multiple locations on a structure to be lifted or otherwise stabilized. What is needed is a lifting device that avoids complex gearing or electrical requirements so that it may be more reliably used at any given site. Further, what is needed is such a lifting device that ensures stable support of trailer structures. Still further, what is needed is a lifting system that departs from the complex and expensive nature of prior lifting devices. What is needed is such a system that can readily be attached at virtually any desired location, and assembled subsequent to manufacture of the structure being lifted.

SUMMARY OF THE INVENTION

It is an object of the present invention to provide an adaptive portable lifting device that is readily attachable to various locations on a trailer structure. Another object of the present invention is to provide such a lifting device that is quickly and easily moveable between various locations on a trailer structure. Yet another object of the present invention is to provide a lifting device that is readily pivoted to a tucked-away position under a trailer structure. Still another object of the present invention is to provide a lifting device that is both coarsely adjustable and finely adjustable in a vertical position so as to be adaptable to fit a wide variety of trailer frame heights. It is also an object of the present invention to provide such a lifting device that readily incorporates a commonly available hydraulic jack.

The adaptive portable lifting device of the present invention includes primarily three sections that include an anchoring bracket, a lift-generating base, and an intermediate section between the bracket and the base. Though other suitable materials and shapes may be utilized, the anchoring bracket is a stainless-steel, U-shaped bracket. The intermediate section may be a fixed length or an adjustable telescoping mid-section such as, but not limited to, concentric sliding tubes. Each tube may be partly or entirely hollow where the inner tube may be mostly a filled cylinder and the outer tube may be only a partly-filled cylinder. Utilizing partly-filled tubes has the advantage of adding columnar support to the lifting device. However, utilizing hollow tubes of a high strength material, such as stainless-steel and the like, will usually be sufficient for most applications. The lift-generating base may be any type of jack means, such as a hydraulic jack or the like. It is important to note that the jack means may be any conventional and readily available jack so long as it is suitable for the given application. For example, a five-ton hydraulic axle jack may be required when the invention is to be utilized under a yacht-trailer, for example.

More particularly, the present invention is designed as a system in which multiple anchoring brackets may be mounted at various locations under the structure to be lifted/leveled, including optionally at its front. Preferably, the anchor brackets are located at structurally-sound positions. The adjustable telescoping mid-section and hydraulic jack base being attached together and moveable between the multiple anchoring brackets. Although this discussion focuses on use of the present invention in the context of fifth-wheel or trailer structures, any similar structure that may require being lifted or stabilized should also be considered as within the context of the present invention (e.g., car-carriers, boat trailers, utility trailers, recreational vehicle trailers, and campers). Also, for purposes of illustration, the present invention is discussed in terms of hydraulic jacks; however, it should be understood that the base mechanism for lifting is not intended to be limited to hydraulic devices. The invention may be utilized in a variety of ways including, but not limited to, providing an enhanced jacking system, assisting in leveling recreational vehicles (RV's), stabilizing trailers and RV's, or providing adequate lift to either side of a vehicle or trailer structure to change tires, service bearings, and other maintenance requiring elevation of wheels. It may also be used as a back-up system for those trailers that must be coupled or uncoupled from a carrier vehicle that normally uses a motorized lifting mechanism.

An adaptive portable lifting device according to the present invention is designed as a lightweight, compact apparatus typically weighing ten pounds or less. Such lifting devices are easily manufactured, safely and reliably operated, and affordable. While stainless steel is referenced as the material for the instant invention, any suitable material may be used so long as it exhibits characteristics for durability similar to stainless steel. The hydraulic jack base is of a standard type such as, but not limited to, a NORCO (™) three-ton capacity professional hydraulic axle jack. The utility of the present invention resides primarily within the versatile adaptability of the lifting device as used with multiple anchoring brackets. Indeed, the present invention may be limited to a two-section apparatus that includes an anchoring bracket and a hydraulic jack base without straying from the present invention's intended scope. This exemplifies the fact that the present invention need not include the intermediate telescoping section in order to exhibit much desired utility.

It is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

DETAILED DESCRIPTION OF THE PREFERRED EMBODIMENT

Figure 1:
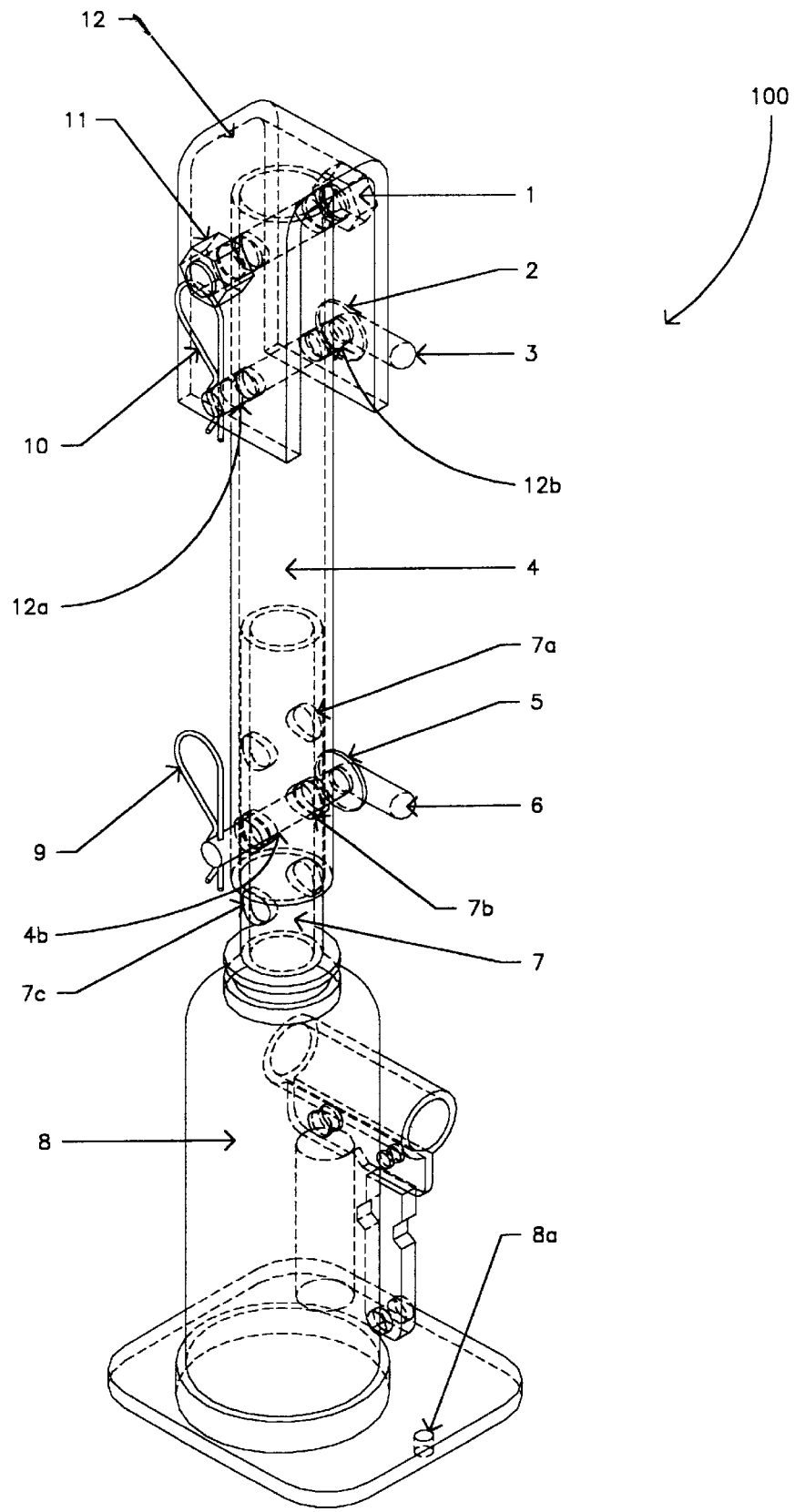
FIG. 1 is a perspective view of an adaptive portable lifting device in accordance with the preferred embodiment of the present invention showing an anchoring bracket, telescoping mid-section, and hydraulic jack base.

In FIG. 1, an adaptive portable lifting device 100 is shown according to the preferred embodiment of the present invention. The adaptive portable lifting device 100 has an anchoring bracket 12, an upper tube 4, a lower tube 7, and a lift-generating base that is shown as a hydraulic jack 8. The hydraulic jack 8 is of any suitable standard type. The upper tube 4 and lower tube 7 are preferably concentric so as to telescope into one another, but such a support means may also be formed as a single tube of a fixed, shorter length if so desired where length is not needed. Also, for added columnar strength, the lower tube 7 may be a substantially solid cylinder and the upper tube 4 may be fabricated as a partially solid cylinder having only a partial tubular section so as to allow the lower tube 7 to fit therein. Preferably however, these tubes 4, 7 are able to telescope between a shortened state and a lengthened state (as discussed later with respect to FIGS. 4 and 5). These tubes 4, 7 are releasably connectable between the anchoring bracket 12 and the hydraulic jack 8. More specifically, upper tube 4 is pivotably held via a bolt 1 and nut 11, or some similar hinge means, within anchoring bracket 12. The anchoring-bracket 12 includes anchor-apertures 12a, 12b. Further, upper tube 4 can be immobilized as seen in FIG. 1 via a retaining-pin shown as first pin 3 with a first washer 2 and a retaining-pin-clip shown as a first pin-clip 10. The first pin 3 passes through anchor-aperture 12b, through an affixing through hole (seen as element 4a in FIG. 4) the upper tube 4, and then through anchor-aperture 12a. Removal is accomplished in reverse in a quick and easy manner by unclipping first pin-clip 10 and manually sliding the first pin 3 out. This arrangement allows the upper tube 4 to pivot freely about the bolt 1 and yet be selectively secured in a rigid orientation when needed. The upper tube 4 is similarly removably attached to the lower tube 7 through a coarse-adjustment through-hole 4b of the upper tube 4. This is accomplished via a coarse-adjustment pin 6 with a coarse-adjustment washer 5 and a second pin-clip 9. The lower tube 7 is, preferably, permanently affixed to the hydraulic jack 8 via some method of attachment such as, but not limited to, welding, chemical bonding, or threading. It should be understood that if a fixed, as opposed to telescoping, support means (not shown) is utilized instead of both tubes 4, 7 only one retaining-pin and retaining-pin-clip would be needed as the second pin 6 and second pin-clip 9 would be omitted.

Figures 2, 3:
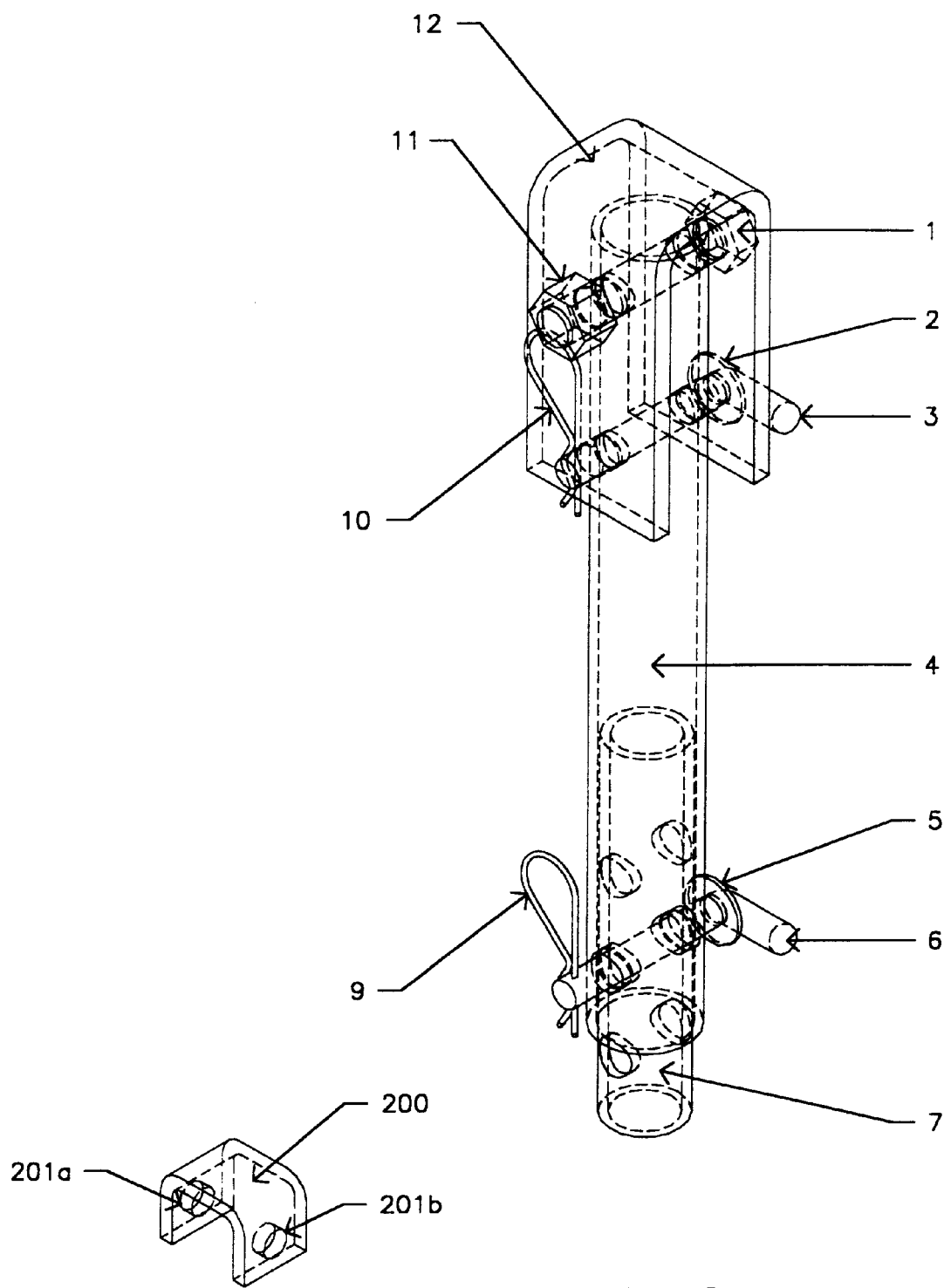
FIG. 2 is a perspective view of the anchoring bracket and telescoping mid-section portions of the adaptive portable lifting device as shown in FIG. 1 and detached from the hydraulic jack base.
FIG. 3 is a perspective view of a receiver bracket used in conjunction with adaptive portable lifting device as shown in FIG. 1.

FIG. 2 illustrates the tubes 4, 7 and anchor bracket 12 being separate from the hydraulic jack 8 shown in FIG. 1. Accordingly, it should be noted that fabrication of the portion of the present invention as shown in FIG. 2 is independent of fabrication of the hydraulic jack 8.

FIG. 3 shows a receiver bracket 200 having receiving-apertures 201a and 201b passing therethrough. The receiver bracket 200 serves to hold the lifting device 100 in a storage position which is typically also a horizontal position. From FIG. 4 which shows the present invention stored in a shortened state, it can be seen that the receiver bracket 200 utilizes a retaining-pin shown as a storage-pin 202 and a retaining pin-clip shown as a storage-pin-clip 203 to hold the present invention in a tucked-away position under a vehicle structure 300 such as, but not limited to, a trailer undercarriage. It should be noted that the storage-pin 202 and storage-pin-clip 203 need not be additional elements. This can be seen from FIG. 4 where anchor-aperture 12a is without any retaining-pin or retaining-pin-clip because it is not needed during storage of the lifting device 100. Rather, the first pin 3 and associated first pinclip 10 are identical and interchangeable with the storage-pin 202 and associated storage-pin-clip 203 such that usually only one pin/pin-clip pair is needed to serve both functions. The storage-pin 202 is designed to pass through a retaining hole 8a visible in FIG. 1. Manual detachment of the storage pin-clip 203 and the storage-pin 202 allows for pivoting movement as shown by the bolded double-ended arrow of FIG. 4. Accordingly, the hydraulic jack 8 may be stored in a horizontal position and is allowed to pivot towards the ground surface 400 when it is used.

Figure 4:
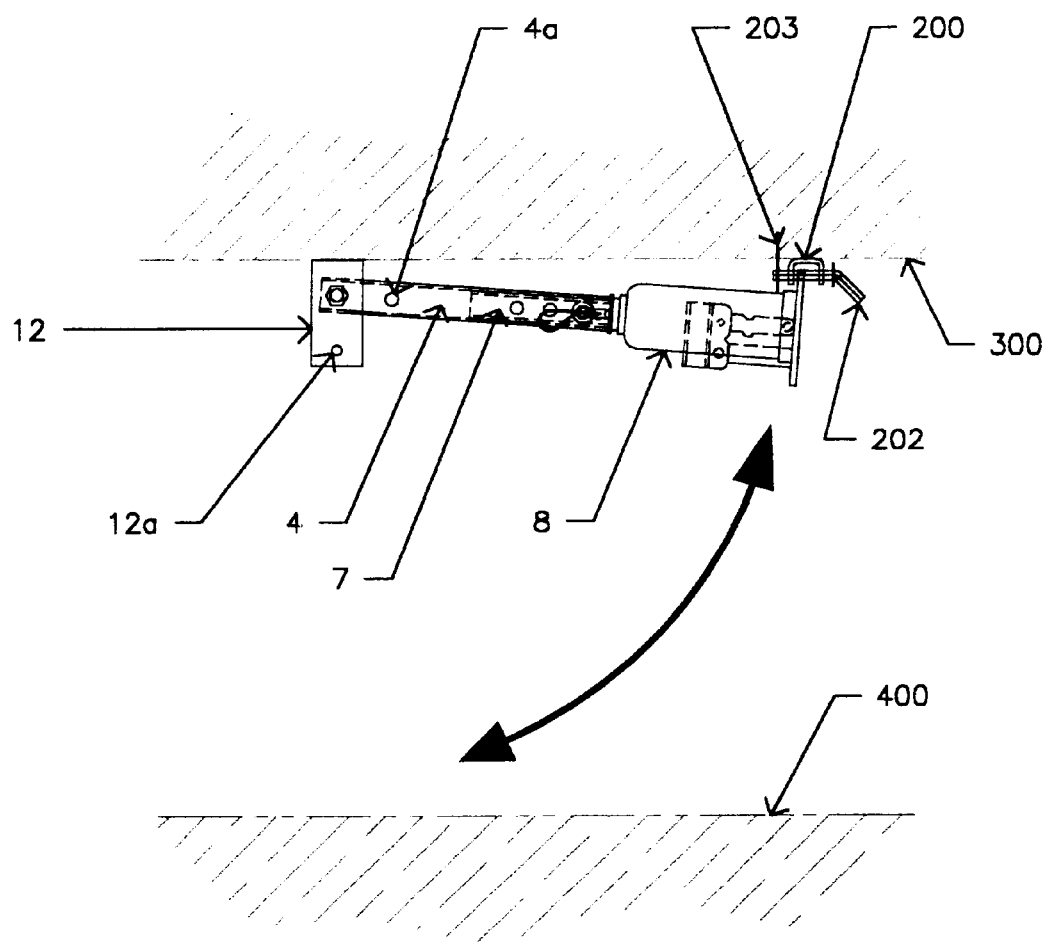
FIG. 4 is a side view of the adaptive portable lifting device as shown in FIG. 1 and placed in a tucked-away position.
Figure 5:
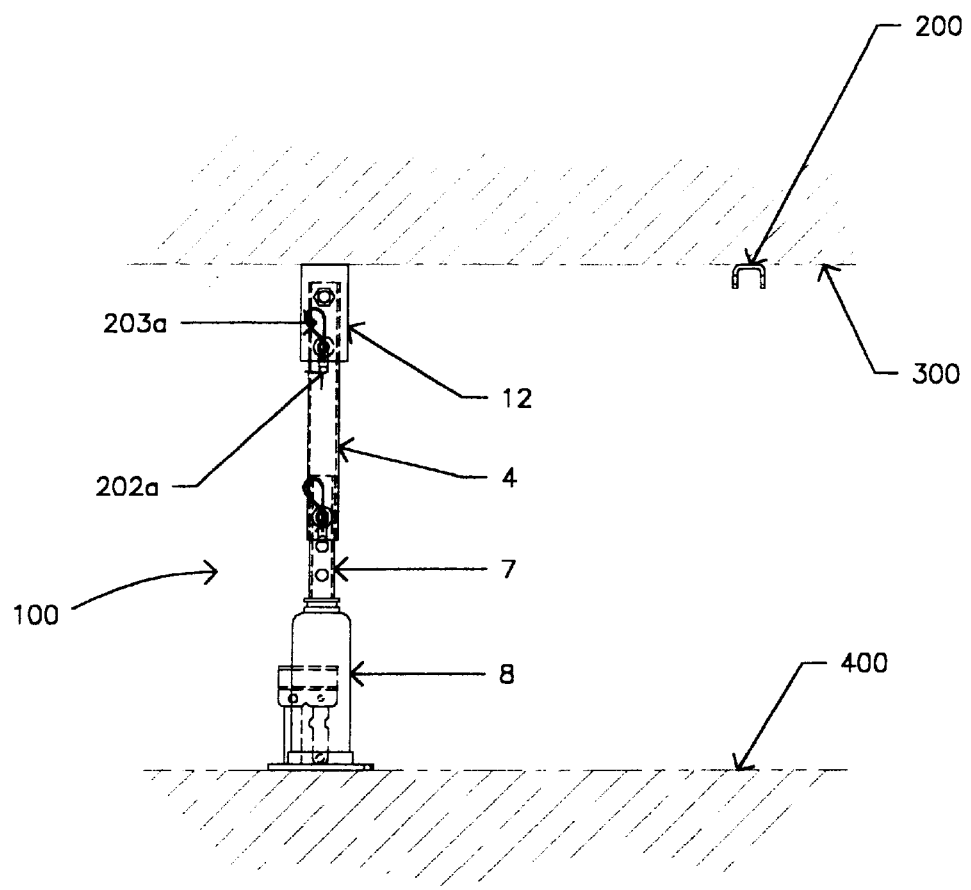
FIG. 5 is a side view of the adaptive portable lifting device as shown in FIG. 1 and placed in a vertical support position.

FIG. 5 shows the lifting device 100 firmly situated between the vehicle structure 300 and the ground surface 400. As mentioned above, the storage-pin 202 and the storage pin-clip 203 used in FIG. 4 to maintain the lifting device 100 in a tucked-away position may also be used (as seen in FIG. 5) as the retaining-pin 202a and pin-clip 203a which keep the upper tube 4 from pivoting. If telescoping adjustment is needed, upper tube 4 and lower tube 7 may be coarsely adjusted. A series of coarse-adjustment holes (seen as elements 7a, 7b, and 7c in FIG. 1) are provided in the lower tube 7 for such coarse adjustment. Fine adjustment, as well as lifting capacity, is accomplished via the hydraulic jack 8 in a standard manner to move the vehicle structure 300 away from the ground surface 400. Disengaging the lifting device of the present invention is simply a matter of reversing the process above.

While the anchor bracket 12 and retaining bracket 200 are shown together in FIG. 5, it should be noted that other anchor brackets (not shown) may be placed on multiple locations on the vehicle structure 300, including near the location of a trailer hitch, if desired. Such an arrangement may be designed in the form of a kit that included the elements of lifting device 100 as well as additional anchor brackets 12. This would allow the tube and jack portion of the lifting device 100 to be movable to an assortment of locations on the vehicle structure 300. Simple removal of the bolt 1 and nut 11 enables such movement.

The above-described apparatus is also well suited for assembly in the form of a kit. Such a kit would include all the elements mentioned above and further include additional retaining brackets 200. The assembly of such a kit would be primarily an after-market process. By the term "after-market", what is meant is that the structure on which the kit is to be utilized will have already been manufactured. Such kits are commonly found in automotive parts stores and are sold as retail "do-it-yourself"products.

Additionally, the preferred embodiment lends itself to a method of the apparatus's (or kit's) use by way of a method for lifting and leveling a structure. The steps of the method according to the preferred embodiment include primarily: a) permanently affixing one or more of the anchor brackets 12 to the structure 300, b) attaching the tubes 4, 7, and the hydraulic jack 8, c) pivoting the tubes 4, 7, and the hydraulic jack 8 together to a vertical position, d) aligning the anchor apertures 12a, 12b with the affixing through hole 4a of the upper tube 4, e) securing the tubes 4, 7, and the hydraulic jack 8 together in this position with the first-pin 3 and first pin-clip 10, and f) actuating the hydraulic jack 8 so as to lift and level the structure 300. Optionally, between the steps b) and c) above, the method involves: aa) permanently attaching the retaining bracket 200 to the structure 300 as shown in FIGS. 4 and 5, bb) pivoting the lifting device 100 to its horizontal position as shown in FIG. 4, cc) aligning the pair of retaining-apertures 201a, 201b with the base thru-hole 8a, and dd) securing the tubes 4, 7, and the hydraulic jack 8 together in this position with the first-pin 3 and first pin-clip 10 that are not now otherwise being used (and are shown as elements 202a and 203a in FIG. 5). Further, between the steps d) and e) above, the method may involve the telescoping aspects within the steps of: aaa) slidably adjusting the lower tube 7 within the upper tube 4, and bbb) aligning of adjustment holes 7a, 7b, 7c with the coarse-adjustment hole 4b so as to allow the coarse-adjustment pin 6 to pass therethrough and be secured therein via the coarse-adjustment pin-clip 9.

It should be understood that the preferred embodiments mentioned here are merely illustrative of the present invention. Numerous variations in design and use of the present invention may be contemplated in view of the following claims without straying from the intended scope and field of the invention herein disclosed.

I claim:

1. An adaptive portable apparatus to be mounted on an underside of a structure for lifting and/or leveling of said structure, said apparatus comprising:
    a) at least one anchor bracket permanently affixed to said underside of said structure, said anchor bracket having a pair of anchor-apertures;
    b) a support means pivotably and removably attachable to said anchor bracket, said support means having a length that is changeable by a coarse-adjustment means and a fine-adjustment means, such that said support means has a shortest length and a greatest length, and having an affixing through-hole alignable with said pair of anchor apertures; and
    c) a retaining-pin passable through said pair of anchor-apertures and said affixing through-hole so as to rigidly fix said support means to said anchor bracket,
    d) a retaining bracket having a pair of retaining-apertures, said retaining bracket designed to be permanently attachable to said underside and to be spaced from said anchor bracket by a distance substantially equal to said support means when said support means has said shortest length, said fine-adjustment means including a base through-hole, said pair of retaining-apertures and said base through-hole being mutually alignable such that said retaining-pin is passable therethrough.

2. The apparatus as claimed in claim 1, wherein said support means comprises a pair of telescoping tubes and said fine-adjustment means, and said fine-adjustment means is a jack.

3. The apparatus as claimed in claim 2, wherein said apparatus is made substantially from stainless-steel.

4. The apparatus as claimed in claim 3, wherein said jack is a standard hydraulic axle jack.

5. The apparatus as claimed in claim 1, wherein
    said support means comprises an upper tube, a lower tube, and said fine adjustment means, said fine adjustment means being a jack, said upper tube including said affixing through-hole and a coarse-adjustment through-hole located near a lower end of said upper tube, said upper tube being attached to said jack via said lower tube, said lower tube being concentric with said upper tube such that said lower tube is slidably adjustable within said upper tube,
    said lower tube including at least one coarse-adjustment hole, said coarse-adjustment hole being alignable with said coarse-adjustment through-hole so as to allow a coarse-adjustment pin to pass therethrough.

6. The apparatus as claimed in claim 5 wherein a portion of said upper tube and substantially all of said lower tube are filled so as to be substantially solid cylinders.

7. The apparatus as claimed in claim 6, wherein said apparatus is made substantially from stainless-steel.

8. The apparatus as claimed in claim 7, wherein said jack is a standard hydraulic axle jack.

9. The apparatus as claimed in claim 8, wherein said structure is a vehicular structure chosen from a group consisting of car-carriers, boat trailers, utility trailers, recreational vehicle trailers, and campers.

10. A kit for adaptive portable lifting and/or leveling of a structure, said kit comprising:
    a) a plurality of anchor brackets locatable at one or more locations on an underside of said structure, each of said plurality of anchor brackets having a pair of anchor-apertures;
    b) a support means, pivotably and removably attachable to any one of said plurality of anchor brackets, said support means having a length that is changeable by a coarse-adjustment means and a fine-adjustment means, such that said support means has a shortest length and a greatest length, said support means having an affixing through-hole alignable with said pair of anchor apertures, and having at least one coarse-adjustment through-hole; and
    c) a retaining bracket locatable on said underside of said structure and spaced from said anchor bracket by a distance substantially equal to said support means when said support means has said shortest length, said retaining bracket having a pair of retaining apertures.

11. The kit as claimed in claim 10, said kit also comprising:
    a) at least one anchor bracket permanently mountable to said underside of said structure, said anchor bracket having a pair of anchor-apertures; and
    b) a retaining-pin, wherein said pair of anchor-apertures is alienable with said affixing through-hole and said retaining pin is passable through said pair of anchor-apertures and said affixing through-hole so as to rigidly fix said support means to said anchor bracket, said retaining-pin being removably retainable therein via a retaining-pin-clip, said retaining-pin being of a diameter less than that of each of said pair of anchor-apertures, said first thru-hole, and said second thru-hole; and
    d) a jack means for providing lengthening and shortening of said apparatus, said jack means being attachable to said support means;
    wherein said support means and said jack means are pivotable together about said at least one anchor bracket so that said first thru-hole and said pair of anchor.

12. The kit as claimed in claim 11, a retaining bracket having a pair of retaining-apertures, said retaining bracket being permanently attachable to said underside and designed to be spaced from said at least one anchor bracket by a distance substantially equal to a combined length of said jack means and said support means when said apparatus is in a shortened state, said jack means including a base thru-hole, and said pair of retaining-apertures and said base thru-hole both being of diameters greater than that of said retaining-pin, said pair of retaining-apertures and said base thru-hole being mutually alignable such that said retaining-pin is allowed to pass wherein said fine-adjustment means includes a base through-hole alignable with said pair of retaining-apertures such that said retaining-pin is passable through said retaining-apertures at said base through-hole.

13. The kit as claimed in claim 12, wherein said support means comprises a pair of telescoping tubes and a fine-adjustment means.

14. The kit as claimed in claim 13, wherein said fine-adjustment means is a jack.

15. The kit as claimed in claim 12, wherein said support means comprises an upper tube, a lower tube, and said fine-adjustment means, said upper tube including said affixing through-hole and a coarse-adjustment through-hole located near a lower end of said upper tube, said upper tube being attached to said fine-adjustment means via said lower tube, said lower tube being concentric with said upper tube such that said lower tube is slidably adjustable within said upper tube, said lower tube including at least one coarse-adjustment hole, said coarse-adjustment hole being alignable with said coarse-adjustment through-hole so as to allow a coarse-adjustment pin to pass therethrough and be secured therein.

16. The kit as claimed in claim 15, wherein a portion of said upper tube and substantially all of said lower tube are filled so as to be substantially solid cylinders.

17. The kit as claimed in claim 16, wherein said kit is made substantially from stainless-steel.

18. The kit as claimed in claim 11, wherein said fine-adjustment means is a hydraulic axle jack.

19. A kit for adaptive portable lifting and/or leveling of a structure, said kit comprising:

a) A plurality of anchor brackets locatable at one or more locations on an underside of said structure, each of said plurality of anchor brackets having a pair of anchor-apertures, at least one of said plurality of anchor brackets being permanently mountable to said underside;

b) a support means, pivotably and removably attachable to any one of said plurality of anchor brackets, said support means comprising an upper tube, a lower tube, and a fine-adjustment means, and having a length that is changeable by a coarse-adjustment means and said fine-adjustment means such that said support means has a shortest length and a greatest length, said fine-adjustment means including a base through-hole, said upper tube including an affixing through-hole near an upper end of said upper tube and a coarse-adjustment through-hole located near a lower end of said upper tube, said upper tube being attached to said fine-adjustment means via said lower tube, said lower tube being concentric with said upper tube such that said lower tube is slidably adjustable within said upper tube, said lower tube including at least one coarse-adjustment hole, said coarse-adjustment hole being alignable with said coarse-adjustment through-hole so as to allow a coarse-adjustment pin to pass therethrough, said affixing through-hole being alignable with said pair of anchor-apertures so as to allow said support means to be rigidly fixable to said one of said plurality of anchor brackets;

c) a retaining pin; and d) a retaining bracket having a pair of retaining-apertures, said retaining bracket locatable on said underside, spaced from one of said plurality of anchor brackets by a distance substantially equal to said support means when said support means has said shortest length;

wherein said pair of retaining apertures is alignable with said base through-hole and said retaining pin is passable through said pair of retaining-apertures and said base through-hole so as to removably attach said support means to said retaining bracket, wherein said pair of anchor-apertures is alignable with said affixing through-hole and said retaining pin is passable through said pair of anchor-apertures and said affixing through-hole so as to rigidly fix said support means in its deployed position, wherein said pair of retaining-apertures is alignable with said base through-hole and said retaining pin is passable through said pair of anchor-apertures and said affixing through-hole so as to removably attach said support means to said retaining bracket in its storage position, and wherein a portion of said upper tube and substantially all of said lower tube are filled so as to be substantially solid cylinders, said fine-adjustment means is a standard hydraulic axle jack, and said structure is a vehicular structure chosen from a group consisting of car-carriers, boat trailers, utility trailers, recreational vehicle trailers, and campers.

* * * * *